United States Patent [19]

Toy

[11] Patent Number: 4,497,926

[45] Date of Patent: Feb. 5, 1985

[54] ELASTOMER BASED ADHESIVE COMPOSITIONS

[75] Inventor: Lester T. Toy, Fremont, Calif.

[73] Assignee: Raychem Corporation, Menlo Park, Calif.

[21] Appl. No.: 586,638

[22] Filed: Mar. 6, 1984

Related U.S. Application Data

[63] Continuation of Ser. No. 335,137, Dec. 28, 1981, abandoned.

[51] Int. Cl.³ .................... C08L 93/00; C09U 7/02; B32B 31/00
[52] U.S. Cl. .................... 524/271; 156/85; 428/343; 524/413; 524/430; 524/431; 524/432; 524/433; 524/472; 524/481
[58] Field of Search ............... 524/271, 413, 430–433, 524/472, 481

[56] References Cited

U.S. PATENT DOCUMENTS

| | | | |
|---|---|---|---|
| 2,295,030 | 12/1942 | Dales | 260/821 |
| 2,407,038 | 12/1946 | Stamberger | 260/23 |
| 2,442,083 | 5/1948 | Hall et al. | 260/93 |
| 2,771,936 | 11/1956 | Iknayan et al. | 154/15 |
| 2,884,400 | 4/1959 | Moore | 524/271 |
| 3,033,724 | 5/1962 | Stokes | 154/50 |
| 3,086,242 | 4/1963 | Cook et al. | 18/1 |
| 3,149,997 | 9/1964 | Tamburro | 524/27 R |
| 3,198,760 | 8/1965 | Widenor | 524/271 |
| 3,242,113 | 3/1966 | Kell | 524/273 |
| 3,258,388 | 6/1966 | Coleman, Jr. et al. | 161/218 |
| 3,455,336 | 7/1969 | Ellis | 138/156 |
| 3,574,792 | 4/1971 | Hayashi | 260/894 |
| 3,595,821 | 7/1971 | Spector et al. | 524/271 |
| 3,616,006 | 10/1971 | Landgraf et al. | 156/133 |
| 3,617,591 | 11/1971 | Petersen et al. | 524/271 |
| 3,674,735 | 7/1972 | Callan | 260/33.6 |
| 3,708,379 | 1/1973 | Flint | 161/36 |
| 3,817,922 | 6/1974 | Barth | 260/53 R |
| 3,925,271 | 12/1975 | Balinth | 260/3 |
| 3,965,061 | 6/1976 | Bash et al. | 524/271 |
| 4,070,746 | 1/1978 | Evans et al. | 29/450 |
| 4,131,634 | 12/1978 | Paulen | 525/133 |
| 4,135,553 | 1/1979 | Evans et al. | 138/141 |
| 4,179,320 | 12/1979 | Midgley et al. | 156/86 |
| 4,207,364 | 6/1980 | Nyberg | 428/36 |
| 4,212,780 | 7/1980 | Fitzgerald | 524/271 |
| 4,267,095 | 5/1981 | del Valle | 524/430 |
| 4,287,012 | 9/1981 | Midgley et al. | 156/86 |

FOREIGN PATENT DOCUMENTS

| | | | |
|---|---|---|---|
| 2531085 | 1/1977 | Fed. Rep. of Germany . | |
| 4625160 | 5/1966 | Japan . | |
| 569528 | 5/1945 | United Kingdom | 524/271 |
| 597181 | 1/1948 | United Kingdom . | |
| 684392 | 12/1952 | United Kingdom | 524/271 |
| 828204 | 2/1960 | United Kingdom . | |
| 1061490 | 3/1967 | United Kingdom . | |
| 1532294 | 11/1978 | United Kingdom . | |
| 1556677 | 11/1979 | United Kingdom . | |

*Primary Examiner*—Herbert S. Cockeram
*Attorney, Agent, or Firm*—Edith A. Rice; Herbert G. Burkard

[57] ABSTRACT

A substantially solvent-free adhesive composition consists essentially of an elastomer and tackifier, a metal oxide and, optionally, a plasticizer. The elastomer is selected from the group consisting of polar elastomers and unsaturated elastomers which have at least 5 mole percent unsaturation, said elastomer being a non-crystalline elastomer or an elastomer which has a slow rate of crystallization such that after a time period of at least 100 hours has elapsed following subjecting the elastomer to a temperature of 70° C. for 30 minutes, the elastomer has a room temperature Shore A hardness of less than 60. The adhesive compositions can be formed into a shaped article, such as of a tape, film, sheet or tubular sleeve, if desired. The compositions have high adhesive strength for bonding together a variety of substrates. The adhesive is particularly useful with a dimensionally recoverable article, such as a shrinkable sleeve, to bond the recovered sleeve to a substrate such as an electric cable.

17 Claims, No Drawings

ELASTOMER BASED ADHESIVE COMPOSITIONS

This application is a continuation, of application Ser. No. 335,137, filed 12/28/81 abandoned.

BACKGROUND OF THE INVENTION

This invention relates to a substantially solvent-free adhesive composition to the use of such an adhesive composition, in particular the use of such an adhesive composition in the form of a sheet, tape, film or the like to bond a polymeric layer to at least a portion of an elongate substrate or substrates.

Dimensionally recoverable articles such as a tubular and wraparound sleeves are well known for use in enclosing an elongate substrate such as pipes or cables and, in particular, cable joints or splices. The dimensionally recoverable sleeve can be a dimensionally heat-recoverable sleeve and can be sealed to the substrate, if desired, using a mastic or hot melt adhesive.

Dimensionally recoverable articles which do not require heat to effect recovery are also well known. Such articles are typically formed of an elastomeric sheet or tube held in an expanded state by a restraining means which can be removed or separated from the elastomeric member to permit it to recover to the unexpanded state. Such articles are also used to enclose elongate substrates and it is also desirable that the recovered article be sealed to the substrate. Generally, contact adhesives have been used for this purpose. The contact adhesive is a solvent based adhesive which can be placed on at least part of the substrate, generally before the recoverable sleeve is placed in position about the substrate. The contact adhesive can be coated on the interior surface of the sleeve, but this has been found not to be practical. Solvent based contact adhesive used in this manner and applied to the substrate only provides a relatively weak adhesive bond. Further, the adhesive has a paste-like consistency making it difficult to apply it uniformly to the substrate. Non-uniform application can lead to inadequate sealing of the recovered sleeve to the substrate. This in turn creates leak paths through which water can migrate. This is particularly undesirable when the substrate enclosed by the sleeve is a joint between electric cables.

This invention provides an adhesive composition which can be in the form of a tape, sheet, film or sleeve for convenient application to an elongate substrate. The flow and adhesive characteristics of the adhesive composition make it particularly suitable for use with a dimensionally recoverable sleeve to seal the recovered sleeve to the substrate.

SUMMARY OF THE INVENTION

One aspect of this invention comprises an adhesive composition consisting essentially of a substantially solvent-free admixture of:
(a) 100 parts of an elastomer selected from the group consisting of polar elastomers and unsaturated elastomers which have at least 5 mole percent unsaturation, said elastomer being a non-crystalline elastomer or an elastomer which has a slow rate of crystallization such that after a time period of at least 100 hours has elapsed following subjecting the elastomer to a temperature of 70° C. for 30 minutes, the elastomer has a room temperature Shore A hardness of less than 60;
(b) 5 to 200 parts of a tackifier;
(c) 0.5–20 parts of an oxide of a metal of Group Ia, IIa, IIb, IVa or VIIb of the Periodic table; and
(d) 0–100 parts of a plasticizer;
said adhesive composition exhibiting a flow of at least 30% at 97° C. under a compressive load of 50 grams.

Another aspect of the invention provides a method of enclosing an elongate substrate which comprises:
(a) positioning a dimensionally recoverable sleeve over at least a portion of said substrate;
(b) interposing a layer of an adhesive composition between said substrate and said article, said adhesive composition consisting essentially of:
(i) 100 parts of an elastomer selected from the group consisting of polar elastomers and unsaturated elastomers which have at least 5 mole percent unsaturation, said elastomer being a non-crystalline elastomer or an elastomer which has a slow rate of crystallization such that after a time period of at least 100 hours has elapsed following subjecting the elastomer to a temperature of 70° C. for 30 minutes, the elastomer has a room temperature Shore A hardness of less than 60;
(ii) 5 to 200 parts of a tackifier;
(iii) 0.5–20 parts of an oxide of a metal of Group Ia, IIa, IIb, IVa or VIIb of the Periodic table; and
(iv) 0–100 parts of a plasticizer;
said adhesive composition exhibiting a flow of at least 30% at 97° C. under a compressive load of 50 grams.
(c) causing said article to dimensionally recover into intimate contact with said adhesive layer.

Yet another aspect of this invention provides a dimensionally recoverable article comprising:
(a) an expanded elastomeric sheet maintained in the expanded state;
(b) restraining means for maintaining said elastomeric sheet in the expanded state; and
(i) 100 parts of an elastomer selected from the group consisting of polar elastomers and unsaturated elastomers which have at least 5 mole percent unsaturation, said elastomer being a non-crystalline elastomer or an elastomer which has a slow rate of crystallization such that after a time period of at least 100 hours has elapsed following subjecting the elastomer to a temperature of 70° C. for 30 minutes, the elastomer has a room temperature Shore A hardness of less than 60;
(ii) 5 to 200 parts of a tackifier;
(iii) 0.5–20 parts of an oxide of a metal of Group Ia, IIa, IIb, IVa or VIIb of the Periodic table; and
(iv) 0–100 parts of a plasticizer;
said adhesive composition exhibiting a flow of at least 30% at 97° C. under a compressive load of 50 grams.

DETAILED DESCRIPTION OF THE INVENTION

The adhesive composition of this invention contains an elastomeric component selected from the group consisting of polar elastomers and unsaturated elastomers which have at least 5 mole percent unstaturation, said elastomer being a non-crystalline elastomer or an elastomer with a slow rate of crystallization.

Polar elastomers which can be used include, for example, polychloroprene (also referred to herein as neoprene), epichlorohydrin elastomers, chloroinated polyethylene, chlorosulfonated polyethylene, propylene oxide elastomer, nitrile elastomers, such as acrylonitrile/butadiene copolymers, acrylic elastomers, such as butyl acrylate homo- and copolymers, ethylene/acrylic acid copolymers, polysulfides, elastomeric vinyl acetate copolymers and polyurethanes. Particularly preferred elastomers are neoprene and epichlorohydrin/ ethylene oxide copolymers. The neoprene used should be one of the so called slow crystallization grades, such as neoprene WK, WD, WRT, TRT or GRT, which are commercially available grades of neoprene.

Unsaturated elastomers which can be used include, for example, polybutadiene, polyisoprene, butadiene and isoprene copolymers such as styrene-butadiene copolymers, styrene-butadiene-styrene block copolymers, and styrene-isoprene-styrene block copolymers, natural rubber and the like. The unsaturated elastomer should contain at least about 5 mole percent unsaturation, preferably at least about 10 mole percent unsaturation.

The elastomer used in the adhesive composition of this invention is a slow crystallizing or non-crystalline elastomer. The rate of crystallization of an elastomer can be determined by a procedure which involves heating a sample of the elastomer at 70° C. for about 30 minutes. The sample is then cooled to room temperature. The Shore A hardness at room temperature is determined at elapsed time intervals. If after about 100 hours the room temperature Shore A hardness is 60 or less the elastomer is referred to herein as a slow crystalizing elastomer. Preferred elastomers for use in preparing the adhesive composition of this invention have a room temperature Shore A hardness of less than 60 after about 200 hours, and in particular after about 350 hours, following the heat treatment.

The adhesive composition contains 5–200 parts by weight per 100 parts of elastomer of a tackifier. Tackifiers that can be used include, for example, rosin, modified rosin, rosin derivatives such as rosin salts or rosin esters, hydrocarbon resins, polymerized petroleum hydrocarbons, polyterpenes, phenolic resins terpene phenolic resins, coumarone-indene resin and the like. The amount of tackifier added to the elastomer depends on the particular elastomer and tackifier used and on the desired end use of the adhesive.

The tackifier can be present in an amount of about 5 parts by weight to about 200 parts by weight, preferably from about 30 parts by weight to about 100 parts by weight per 100 parts by weight of elastomer.

The adhesive composition preferably contains up to about 20 parts by weight per 100 parts of elastomer of a metal oxide. The metal oxide is preferably an oxide of a Group Ia, IIa, IIb, IVa or VIIb metal of the Periodic Table. (The Periodic Table referred to herein is that found in the "Handbook of Chemistry and Physics" 50th edition, 1969-1970, published by The Chemical Rubber Company). Particularly preferred are the oxides of lead, zinc or magnesium or mixtures of such oxides.

The amount of metal oxide added can be up to about 20 parts by weight per 100 parts by weight of elastomer. Preferably the metal oxide is present in an amount of about 0.5 to about 10 parts by weight and most preferably in an amount of about 1 to about 6 parts by weight per 100 parts by weight of elastomer.

The adhesive composition can also contain a plasticizer. The plasticizer can be present in amounts ranging from 0 to 100 parts by weight per 100 parts by weight of the elastomer. Preferably, the plasticizer will be present in an amount from about 10 to about 80 parts by weight, particularly from about 30 to about 70 parts by weight per 100 parts by weight of the elastomer. The amount of plasticizer used will depend on the particular elastomer used in the adhesive composition also on the nature of the plasticizer.

Typical plasticizers which can be used include, for example, chlorinated paraffins, esters such as dioctyl phthalate or dioctyl adipate, polymeric esters, petroleum oil including aromatic naphthenic and paraffinic oil, and liquid or low molecular weight polymers and elastomers such as low molecular weight polychloroprene, epichlorohydrin polymers, nitrile polymers, polysulfides, polyisoprene, polyisobutylene, polybutene, butyl rubber, polyurethane and the like.

The particular plasticizer selected and the amount used will depend on the elastomer of the adhesive composition. The plasticizer selected should be compatible with the elastomer and promote the desired properties of the adhesive.

The adhesive compositions can contain other additives, for example, antioxidants, acid scavengers, flame retardants, fillers, processing aids and the like.

The adhesive compositions are substantially solvent-free. By substantially solvent-free is meant that no more than about five percent of a solvent is present in the composition. The compositions are generally used in the form of a tape, sheet, film, tubular sleeve or other desired shape. The adhesive compositions have particularly high adhesive strength and can be used with a variety of substrates. Substrates which can be joined using the adhesive compositions of this invention include polymers and elastomers, such as polyethylene, polyvinyl chloride, neoprene, metals such as lead, copper, and the like.

The adhesive compositions can be formed and processed using conventional techniques and equipment. The adhesive components can be added to a mixer such as a two-roll mill, a Sigma mixer, twin-screw extruder of the type suitable for use with elastomeric materials, and the like. The adhesive formulation can be shaped into the desired configuration, such as a tape or sheet, by extrusion, compression molding, calendaring, or the like. The adhesive can be laminated to one of the substrates to be bonded. In some embodiments it may be convenient to coextrude a polymeric substrate and the adhesive composition forming an integral structure.

The adhesive compositions have high adhesive strength and can be applied to a variety of substrates as mentioned above. It is believed that the flow characteristics of the adhesive compositions of this invention contribute to this high adhesive strength. The ability of the compositions to flow permits adequate wetting of the substrates by the substantially solvent-free adhesive compositions. Flow of the adhesive also results in uniform distribution of the adhesive forming a water-tight seal between the substrates. It is believed that the ability of the compositions to flow indicates that the adhesive compositions are not highly cross-linked.

It has been found that the adhesive compositions should flow at least about 30%, preferable at least about 50%, at 97° C. The flow characteristics are measured, as described in more detail hereinafter, using a thermomechanical analyzer. A sample of the elastomer is placed under a compressive load and the change in thickness of the sample measured. This measurement indicates the degree to which the elastomer flowed under pressure. If the flow is less than about 30% at 97° C., the composition is considered to have insufficient flow to perform satisfactorily as an adhesive.

EXAMPLES

Each composition listed in Table I was prepared by adding the components one at a time to a 3 inch roll mill, heated to a temperature of 50° to 80° C. The composition was mixed for a period of time sufficient to obtain a good dispersion, generally about 30–60 minutes. The components and the amount used in each composition in parts by weight is given in Table I.

Flow Determination

The flow characteristics of each adhesive composition was determined using a Thermomechanical Analyzer, commercially available from Perkin Elmer Corporation. A sample ¼" in diameter and 0.05 inch thick was placed in the Thermomechanical Analyzer on the floor of the quartz sample tube. The quartz probe was placed in contact with the sample and a 50 gram load was placed on the probe. The sample was heated from −30° C. to +120° C. at a heating rate of 5° C. per minute. Changes in sample thickness were measured at intervals as the sample was heated under the applied load. Flow (97° C.) was determined as the percent change in sample thickness, at 97° C., i.e. the ratio of the change in sample thickness to the original sample thickness, multiplied by 100.

The results are shown in Table I.

Adhesive Strength Testing

The compositions were tested to determine their adhesive strength.

A 60 gram sample of each composition was pressed into a slab, 6 inches by 6 inches by 0.050 inch, using a press set at 100° C. for 8 minutes at 20,000 pounds pressure. The slab was removed from the hot press and placed in a cold press at 25° C. for 5 minutes at 20,000 pounds.

The sample was tested for adhesive strength by cutting the slabs into 1 inch strips. The strips were wrapped over a portion of an electric cable having a neoprene outer jacket. The dimensionally recoverable tubular article comprising an expanded neoprene sheet held in the expanded state with a solvent releasable external hold-out layer, was positioned over the adhesive strips wound on the cable. Solvent was applied to release the recoverable neoprene sheet from the hold-out allowing it to recover and shrink into contact with the adhesive coated cable portion. After about 24 hours the cable portion was cut into 1 inch samples. The electric wires were removed and the sample was slit open. The neoprene jacket of the cable and the recovered neoprene layer were grasped in an Instron and pulled apart in a T-peel test. The adhesive strength in pounds per linear inch (pli) is given in Table II. The samples were pulled at room temperature at a rate of 50 millimeters per minute. The results are given in Table II. Also noted was whether the sample failed cohesively, that is failure of the adhesive layer, or adhesively, that is failure at the interface between the adhesive and either of the neoprene layers.

Certain of the adhesive compositions were also tested, as above, to bond a recovered neoprene article to a copper tube and to an electric cable with a cross-linked polyethylene outer jacket. In each instance, the adhesive strength was tested using a rolling drum peel test. In this test the tube or cable was not slit open, but mounted on a suitable drum. A cut was made through the recovered neoprene sleeve and the adhesive layer and the force needed to separate the adhesive from the copper tube or polyethylene jacket was determined. Whether the failure was cohesive or adhesive was noted.

The Hydrin-based adhesives were tested by pressing a layer of the adhesive between two ethylene/vinyl acetate copolymer (containing 18% vinyl acetate) sheets to be bonded together at room temperature under contact pressure for 2 minutes. The bonded structure was then subjected to a T-peel adhesive test as described above.

The results of the adhesive strength testing is shown in Table II.

In Table I the following notations are used:

Neoprene WRT—a slow crystallizing grade of neoprene (commercially available from Du Pont)
Hydrin 200—(an epichlorohydrin-ethylene oxide copolymer commercially available from Goodrich Chemical Company)
ZnO—Zinc Oxide
MgO—Magnesium Oxide
$CaCO_3$—Calcium Carbonate
SP553—a terpene phenolic resin (commercially available from Schenectady Chemical Company)
FRJ551—a reactive phenolic resin (commercially available from Schenectady Chemical Company)
Stabelite Ester 10—Rosin ester (commercially available from Hercules, Inc.)
Neoprene FB—a low molecular neoprene (commercially available from Du Pont)
Hydral—Alumina trihydrate (commercially available from Alcoa)
Octamine—an amine antioxidant produced by reacting diphenylamine with diisobutylene (commercially available from Vanderbilt Chemical Company)
$Sb_2O_3$—Antimony oxide
Chlorowax 70L—high viscosity grade chlorinated paraffin wax
Chlorowax 40—low molecular weight chlorinated paraffin wax
AO97—Polyketone resin (commercially available from 40 Chemical Company)
Hycar 2216X2—a liquid epichlorohydrin homopolymer (commercially available from B. F. Groodrich Chemical Company)
Agerite Resin D—polymerized 1,2-dihydro-2,2,4-trimethylquinoline, an antioxidant (commercially available from B. F. Goodrich Chemical Company)

| Composition | A | B | C | D | E | F | G |
|---|---|---|---|---|---|---|---|
| Neoprene WRT | 100 | 100 | 100 | 100 | 100 | 100 | 100 |
| Hydrin 200 | — | — | — | — | — | — | — |
| Neoprene FB | 55 | 55 | 55 | 55 | 55 | — | — |
| Chlorowax 70L | — | — | — | — | — | — | 55 |
| Chlorowax 40 | — | — | — | — | — | — | — |
| Hycar 2216X2 | — | — | — | — | — | — | — |
| ZnO | 3 | 3 | 3 | 3 | 3 | 3 | 3 |
| MgO | 3 | 3 | 3 | 3 | 3 | 3 | 3 |
| $CaCO_3$ | — | — | — | — | — | — | — |
| SP553 | — | 35 | — | — | 70 | 35 | 35 |
| FRJ551 | — | — | 35 | — | — | — | — |
| Stabelite Ester 10 | — | — | — | — | — | — | — |
| AO97 | — | — | — | — | — | — | — |
| Hydral | 35 | 35 | 35 | — | — | 35 | 35 |
| $Sb_2O_3$ | — | — | — | — | — | — | — |
| Octamine | 3 | 3 | 3 | 3 | 3 | 3 | 3 |

-continued

| | | | | | | | |
|---|---|---|---|---|---|---|---|
| Agerite Resin D | — | — | — | — | — | — | — |
| Flow at 97° C. (%) | — | — | 70 | — | — | — | 80 |

| Composition | H | I | J | K | L | M | N |
|---|---|---|---|---|---|---|---|
| Neoprene WRT | 100 | 100 | 100 | 100 | 100 | 100 | 100 |
| Hydrin 200 | — | — | — | — | — | — | — |
| Neoprene FB | 55 | 55 | 55 | 55 | 55 | 55 | 55 |
| Chlorowax 70L | — | — | — | — | — | — | — |
| Chlorowax 40 | — | — | — | — | — | — | — |
| Hycar 2216X2 | — | — | — | — | — | — | — |
| ZnO | — | — | — | 1 | — | — | 1 |
| MgO | — | — | — | — | 2 | 3 | 3 |
| CaCO3 | — | — | — | — | — | — | — |
| SP553 | 35 | 35 | — | 35 | 35 | 35 | 35 |
| FRJ551 | — | — | 35 | — | — | — | — |
| Stabelite Ester 10 | — | — | — | — | — | — | — |
| AO97 | — | — | — | — | — | — | — |
| Hydral | 35 | 35 | 35 | 35 | 35 | 35 | 35 |
| Sb2O3 | — | — | — | — | — | — | — |
| Octamine | — | 3 | 3 | 3 | 3 | 3 | 3 |
| Agerite Resin D | — | — | — | — | — | — | — |
| Flow at 97° C. (%) | — | 100 | 100 | 100 | 100 | 100 | 100 |

| Composition | O | P | Q | R | S | T |
|---|---|---|---|---|---|---|
| Neoprene WRT | 100 | — | — | 100 | 100 | 10 |
| Hydrin 200 | — | 100 | 100 | — | — | — |
| Neoprene FB | 55 | — | — | 55 | 55 | 5 |
| Chlorowax 70L | — | — | — | — | — | — |
| Chlorowax 40 | — | — | — | — | — | 3 |
| Hycar 2216X2 | — | 50 | 50 | — | — | — |
| ZnO | — | — | — | 2 | 2 | — |
| MgO | 5 | 3 | 3 | 2 | 2 | — |
| CaCO3 | — | 5 | 5 | 50 | 50 | — |
| SP553 | 35 | — | — | — | 35 | 3 |
| FRJ551 | — | — | 35 | — | — | — |
| Stabelite Ester 10 | — | — | — | 35 | — | — |
| AO97 | — | —35 | — | — | — | — |
| Hydral | 35 | 25 | 25 | — | — | 3 |
| Sb2O3 | — | — | — | — | — | 1 |
| Octamine | 3 | — | — | 2 | 2 | — |
| Agerite Resin D | — | 2 | 2 | — | — | — |
| Flow at 97° C. (%) | 77 | 77 | 100 | — | — | — |

TABLE II

| Composition | Substrates | Test Method | Adhesive Strength (PLI) | Mode of Failure* |
|---|---|---|---|---|
| A | Neoprene/Neoprene | T-Peel | 15.5 | AF |
| B | Neoprene/Neoprene | T-Peel | 20.7 | CF |
| C | Neoprene/Neoprene | T-Peel | 15.9 | CF |
| | Neoprene/Polyethylene | Drum | 22.9 | CF/AF |
| | Neoprene/Copper | Drum | 14 | CF/AF |
| D | Neoprene/Neoprene | T-Peel | 11.3 | AF |
| E | Neoprene/Neoprene | T-Peel | 21.7 | CF/AF |
| F | Neoprene/Neoprene | T-Peel | 22.2 | CF/AF |
| G | Neoprene/Neoprene | T-Peel | 12.4 | CF |
| H | Neoprene/Neoprene | T-Peel | 5.4 | CF |
| I | Neoprene/Neoprene | T-Peel | 14.3 | CF |
| J | Neoprene/Neoprene | T-Peel | 16.1 | CF/AF |
| K | Neoprene/Neoprene | T-Peel | 11.6 | CF |
| L | Neoprene/Neoprene | T-Peel | 14 | CF |
| M | Neoprene/Neoprene | T-Peel | 10.3 | CF |
| N | Neoprene/Neoprene | T-Peel | 16.1 | CF/AF |
| O | Neoprene/Neoprene | T-Peel | 11.3 | CF |
| | Neoprene/Polyethylene | Drum | 19.8 | CF |
| | Neoprene/Copper | Drum | 11.5 | CF |
| P | both Ethylene/Vinyl-acetate | T-Peel | 8.1 | CF |
| Q | both Ethylene/Vinyl-acetate | T-Peel | 14.3 | CF |
| R | Neoprene/Neoprene | T-Peel | 7.1 | CF |
| S | Neoprene/Neoprene | T-Peel | 8.7 | CF |
| T | Neoprene/Neoprene | T-Peel | 5.9 | CF |

*Mode of Failure
AF = adhesive failure
CF = cohesive failure

As mentioned above, the adhesive compositions of this invention are particularly useful for use with dimensionally recoverable articles to bond the recovered article to a substrate. The dimensionally recoverable article can be a dimensionally heat-recoverable article, such as heat-shrinkable polymeric tubing and wrap-around sleeves which are well known. For example, see U.S. Pat. Nos. 3,086,242, 3,455,336 and 4,207,364 (the disclosures of which are incorporated herein by refernce) for a description of typical articles of this type. Such dimensionally heat-recoverable articles are frequently lined with a mastic or hot melt adhesive. The adhesive compositions of this invention can be used with such heat-recoverable articles. The adhesive composition is interposed between the recoverable article and the substrate. The adhesive can be in the form of a tape, sheet, film, sleeve or laminated to the recoverable article.

The adhesive compositions are particularly suitable for use with dimensionally recoverable articles which do not require heat to cause recovery thereof. The flow and adhesive characteristics of the adhesives of this invention are such that heat is not required to cause the adhesive to flow and wet the substrate or otherwise activate the adhesive. Dimensionally recoverable articles which do not require heat to effect recovery are typically elastomeric articles held under tension in an expanded state. When the means holding the elastomeric member in the expanded state is removed, released or otherwise separated from the expanded elastomeric member, the elastomeric member recovers to its original unexpanded state. The means holding or retaining the elastomeric member in the expanded state can be an internal means such as that disclosed in U.S. Pat. No. 3,515,798, but is preferably on external means such as that described in U.S. Pat. Nos. 4,070,746, 4,135,553, 4,179,320, 4,287,012, and U.K. Pat. No. 1,556,677, the disclosures of which are incorporated herein by reference.

The adhesive compositions can be used with dimensionally recoverable articles of this type in the same manner as described above with heat-recoverable articles. The adhesive and flow characteristics of the compositions are such that the adhesive composition flows and wets the inner surface of the recoverable article and the substrate without application of heat. The adhesive compositions can be used at temperatures of 20° C. and lower depending on the particular elastomer used in the composition. The adhesive can be laminated to the recoverable elastomeric sheet or can even be coextruded with the elastomeric sheet as it is being produced, if desired.

Dimensionally recoverable articles of this type comprise a recoverable sleeve of elastomeric material and a suitable restraint or hold out means. The sleeve can be an expanded tube of elastomeric material or can be a longitudinal slit tube held under tension. The elastomeric sleeve can be virtually any desired material possessing elastomeric recovery properties. Suitable elastomers include materials such as natural and synthetic polyisoprenes, polybutadiene, styrene-butadiene rubber (SBR), butadiene-acrylonitrile rubber, polychloroprene (Neoprene), butyl rubber, polysulfide, silicone rubber, urethane rubber, polyacrylate, epichlorohydrin homo- and copolymers, propylene oxide rubber, fluorosilicone rubber, fluorocarbon rubber, chlorosulfonated polyethylene, chlorinated polyethylene, ethylenepropylene rubber, nitroso rubber and phosphonitrilic rubber. The properties of the sleeve are, to a large extent, dependent upon the intended use of the sleeve. Thus, if the sleeve is to be used primarily as an electrical insulation, its electrical properties will be of primary importance. On the other hand, if the sleeve will be subjected to much physical abuse, it may be necessary to provide a sleeve which has toughness, good flame resistance, good solvent resistance, etc. For high voltage uses, it may be desirable to have a sleeve which has been made semiconductive by dispersing large amounts of suitable fillers or conductive particles in the sleeve or possesses resistance to tracking and/or erosion.

The adhesive composition used should be compatible with the elastomeric material of the recoverable articles. For example, a neoprene based adhesive can be used with a neoprene recoverable sleeve. Such similarity between the sleeve and adhesive is not, however, essential as the adhesive compositions of this invention are compatible with numerous substrates. The adhesive composition should also be compatible with the substrate to be covered. When the substrate is an elastomeric cable, the adhesive composition can contain additives to improve certain properties such as fire retardency, electrical properties and the like.

The present invention has been set forth in the form of several preferred embodiments. It is nevertheless understood that modifications may be made by those skilled in the art without departing from the spirit and scope of the present invention. Moreover, such modifications are considered to be within the purview of the appended claims.

I claim:

1. An adhesive composition consisting essentially of a substantially solvent-free admixture of:
   (a) 100 parts by weight of an elastomer selected from the group consisting of polar elastomers and unsaturated elastomers which have at least 5 mole percent unsaturation, said elastomer being a non-crystalline elastomer or an elastomer which has a slow rate of crystallization such that after a time period of at least 100 hours has elapsed following subjecting the elastomer to a temperature of 70° C. for 30 minutes, the elastomer has a room temperature Shore A hardness of less than 60;
   (b) 5 to 200 parts by weight of a tackifier;
   (c) 0.5–20 parts by weight of an oxide of a metal of Group Ia, IIa, IIb, IVa or VIIb of the Periodic table; and
   (d) 0–100 parts by weight of a plasticizer;
said adhesive composition exhibiting a flow of at least 30% at 97° C. under a compressive load of 50 grams.

2. A composition in accordance with claim 1, wherein said adhesive composition is in the form of a tape, sheet, film or sleeve.

3. A composition in accordance with claim 2, wherein said adhesive composition is in the form of a tape.

4. A composition in accordance with claim 1, wherein said elastomer is slow crystallizing neoprene.

5. A composition in accordance with claim 1, wherein said elastomer is an epichlorohydrin/ethylene oxide copolymer.

6. A composition in accordance with claim 1, wherein said tackifier is present in an amount in the range of from about 30 to about 100 parts by weight per 100 parts by weight of elastomer.

7. A composition in accordance with claim 1, wherein said tackifier is selected from the group consisting of rosin, modified rosin, rosin derivatives such as rosin salts or rosin esters, hydrocarbon resins, polymerized petroleum hydrocarbons, polyterpenes, phenolic resins, terpene phenolic resin comarone-indene resin.

8. A composition in accordance with claim 6, wherein said tackifier is a phenolic resin.

9. A composition in accordance with claim 6, wherein said tackifier is a terpene-phenolic resin.

10. A composition in accordance with claim 6, wherein said tackifier is a rosin derivative.

11. A composition in accordance with claim 1, wherein said metal oxide is present in an amount in the range of from about 0.5 to about 10 parts by weight per 100 parts by weight of the elastomer.

12. A composition in accordance with claim 1, wherein said metal oxide is selected from the group consisting of the oxides of zinc, magnesium and lead.

13. A composition in accordance with claim 1, wherein said metal oxide is zinc oxide.

14. A composition in accordance with claim 1, wherein said metal oxide is magnesium oxide.

15. A composition in accordance with claim 1, wherein said plasticizer is present in an amount in the range of from about 10 to about 80 parts by weight per 100 parts by weight of elastomer.

16. A composition in accordance with claim 1, wherein said plasticizer is a low molecular weight neoprene.

17. An adhesive composition consisting essentially of 100 parts by weight of slow crystallizing neoprene, 30 to 100 parts by weight of terpene phenolic tackifier, 0.5 to 10 parts by weight of metal oxide selected from the group consisting of zinc oxide, magnesium oxide, and mixtures thereof and 10 to 80 parts by weight of a plasticizer selected from the group consisting of low molecular weight neoprene, chlorinated paraffin wax and mixtures thereof.

* * * * *